US010019729B2

(12) United States Patent
Kang et al.

(10) Patent No.: US 10,019,729 B2
(45) Date of Patent: Jul. 10, 2018

(54) SYSTEMS AND METHODS FOR PROGRAMMATIC TESTING TO DETERMINE USER ATTENTION FOR ADVERTISEMENTS

(71) Applicant: Vungle, Inc., San Francisco, CA (US)

(72) Inventors: Daniel Kang, San Francisco, CA (US); Ben Bear, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 0 days.

(21) Appl. No.: 14/677,958

(22) Filed: Apr. 2, 2015

(65) Prior Publication Data
US 2016/0292715 A1 Oct. 6, 2016

(51) Int. Cl.
*G06Q 30/02* (2012.01)

(52) U.S. Cl.
CPC .............. *G06Q 30/0244* (2013.01)

(58) Field of Classification Search
CPC ................................. G06Q 30/0211
USPC ..................................... 705/14.13
See application file for complete search history.

(56) References Cited

U.S. PATENT DOCUMENTS

| | | | | |
|---|---|---|---|---|
| 7,010,497 | B1* | 3/2006 | Nyhan et al. | 705/14.44 |
| 2002/0062248 | A1* | 5/2002 | Sakurai | 705/14 |
| 2003/0191653 | A1* | 10/2003 | Birnbaum et al. | 705/1 |
| 2003/0195807 | A1* | 10/2003 | Maggio et al. | 705/14 |
| 2007/0206606 | A1* | 9/2007 | Coleman | G06O 30/02 370/395.52 |
| 2010/0169910 | A1* | 7/2010 | Collins | G06Q 30/0251 725/14 |
| 2010/0287043 | A1* | 11/2010 | Gould | G06Q 30/02 705/14.12 |
| 2012/0072286 | A1* | 3/2012 | Kilar | G06Q 30/02 705/14.55 |
| 2013/0006706 | A1* | 1/2013 | Harvey | G06Q 10/0639 705/7.29 |
| 2013/0073398 | A1* | 3/2013 | Levy | G06Q 30/0241 705/14.72 |
| 2013/0110617 | A1* | 5/2013 | Phan | H04W 4/206 705/14.43 |

(Continued)

OTHER PUBLICATIONS

Gluck, Marissa, "IAB Ad Engagement", *Radar Research*, Dec. 5, 2012, 15 pages.

*Primary Examiner* — David J Stoltenberg
(74) *Attorney, Agent, or Firm* — Jaffery Watson Mendonsa & Hamilton LLC

(57) ABSTRACT

Methods and systems are described for providing programmatic testing of users to determine user attention for advertisements. In one embodiment, a system includes an advertising campaign framework having a testing platform, one or more application programming interfaces (APIs), and software components. A storage medium stores instructions of the testing platform, one or more APIs, and software components. Processing logic is configured to execute the instructions to receive a function call from an ad test software or an ad campaign software of an advertising entity, to provide a set of functionality for programmatically creating one or more tests to be displayed within an initiated software application of a user during an ad campaign to determine user attention during the one or more tests, and to generate a response that is sent to the ad test software or the ad campaign software of the advertising entity.

20 Claims, 9 Drawing Sheets

(56) References Cited

U.S. PATENT DOCUMENTS

2013/0121591 A1* 5/2013 Hill .......................... G06K 9/46
  382/195
2014/0337147 A1* 11/2014 DaSilva ............. G06Q 30/0241
  705/14.73
2014/0344034 A1 11/2014 Goodman et al.

* cited by examiner

| AD TEST 510 | FUNCTION 520 | FUNCTION 530 | FUNCTION 540 | FUNCTION 560 | FUNCTION n |
|---|---|---|---|---|---|
| AD TEST 512 | COST 522 | TYPE 532 | QUESTION(S) 542 | % VIEWERS 562 | PLACEMENT 552 |
| AD TEST 514 | COST 524 | TYPE 534 | QUESTION(S) 544 | % VIEWERS 564 | PLACEMENT 554 |
| AD TEST 516 | COST 526 | TYPE 536 | QUESTION(S) 546 | % VIEWERS 566 | PLACEMENT 556 |
| AD TEST 518 | COST 528 | TYPE 538 | QUESTION(S) 548 | % VIEWERS 568 | PLACEMENT 558 |
| • • • | • • • | • • • | • • • | • • • | • • • |
| AD TEST n | COST n | TYPE n | QUESTION n | % VIEWERS n | PLACEMENT n |

500

SYSTEMS AND METHODS FOR PROGRAMMATIC TESTING TO DETERMINE USER ATTENTION FOR ADVERTISEMENTS

FIELD OF THE INVENTION

Embodiments of the invention are generally related to systems and methods for providing programmatic testing of users to determine user attention for advertisements.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads. Advertisers can create an advertising campaign as a series of advertisement messages that share a single idea and theme. The advertising campaigns appear in different media across a specific time frame. However, advertisers may lack the resources and expertise for determining if user is responsive and interested in the ads.

SUMMARY

Methods and systems are described for providing programmatic testing of users to determine user attention for advertisements. In one embodiment, a system includes an advertising campaign framework having a testing platform, one or more application programming interfaces (APIs), and software components including one or more software programs and software code libraries. A storage medium stores instructions of the testing platform, one or more APIs, and software components. Processing logic is coupled to the storage medium. The processing logic is configured to execute the instructions to receive a function call from an ad campaign software of an advertising entity, to provide a set of functionality for programmatically creating one or more tests to be displayed within an initiated software application of a user during an ad campaign to determine user attention during the one or more tests, and to generate a response that is sent to the ad campaign software of the advertising entity. The response includes one or more function calls with parameters including cost information for a type of ad campaign and types of the one or more tests in response to the function call received from the ad campaign software.

For example, the parameters of the response may include an identification of the ad campaign and features or functions of the ad campaign including a type of operating system for a mobile device and the cost information for a type of ad campaign (e.g., CPI, CPC, CPV, CPA, etc.). In one embodiment, the cost information for a type of ad campaign includes cost-per-install of software applications on devices or systems (e.g., mobile devices, tablets, etc).

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
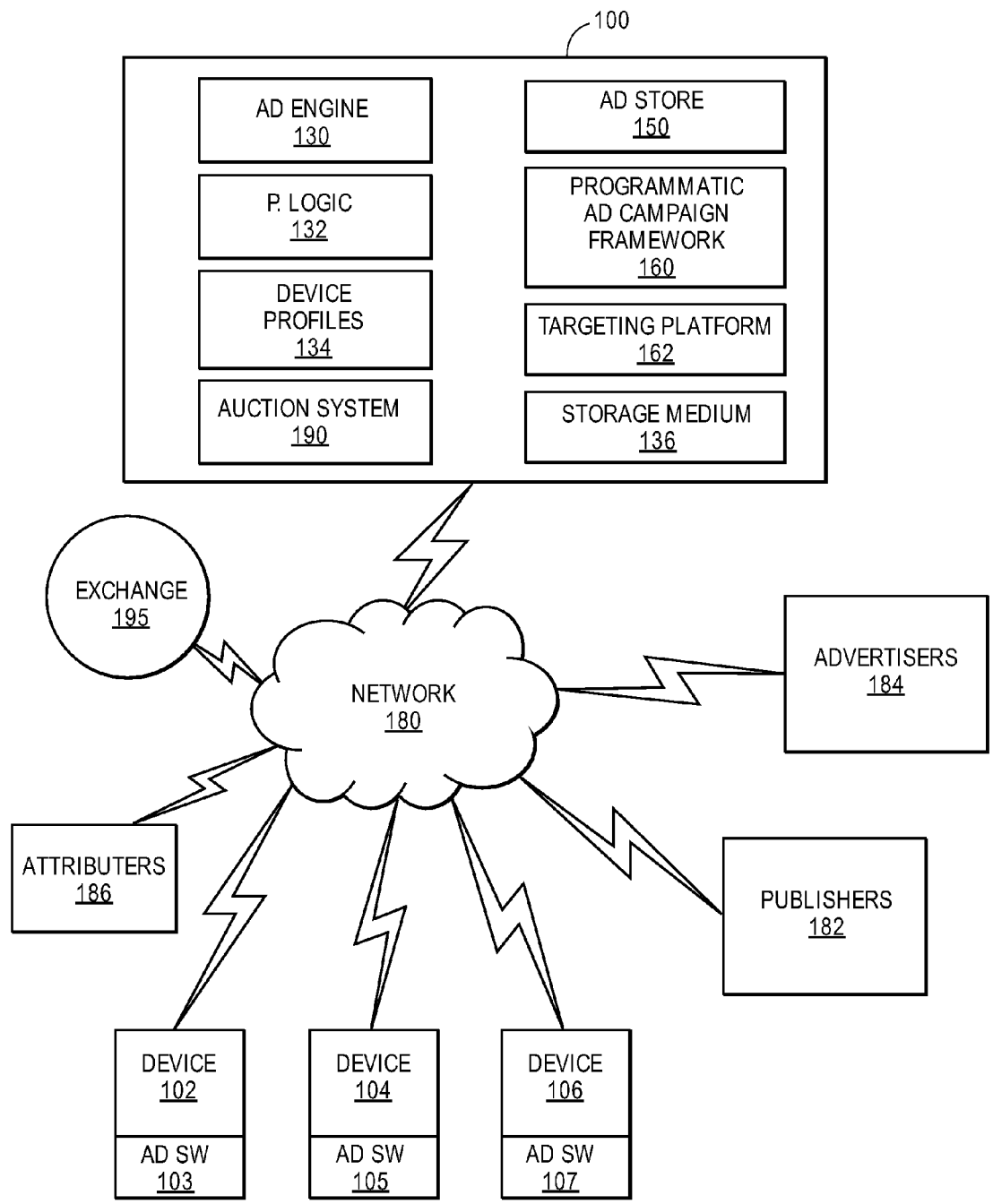
FIG. 1 shows an embodiment of a block diagram of a system 100 for providing programmatic creation and modification of advertising campaigns and ad tests in accordance with one embodiment.

Methods and systems are described for providing programmatic creation and modifications of ad tests for determining a level of user interest in viewing advertising services including advertising campaigns. In one embodiment, a system includes an advertising campaign framework having a testing platform, one or more application programming interfaces (APIs), and software components including one or more software programs and software code libraries. A storage medium stores instructions of the testing platform, one or more APIs, and software components. Processing logic is coupled to the storage medium. The processing logic is configured to execute the instructions to receive a function call from an ad campaign software of an advertising entity, to provide a set of functionality for programmatically creating one or more tests to be displayed within an initiated software application of a user during an ad campaign to determine user attention during the test, and to generate a response that is sent to the ad campaign software of the advertising entity. The response includes one or more function calls with parameters including cost information for a type of ad campaign and a type of test in response to the function call received from the ad campaign software.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions. In one example, CPA is defined by an advertiser. CPA is an advertising pricing model in which the advertiser pays for each specified action (e.g., impression, click, form submit, opt-in, sale, etc.). The advertiser determines the desired action. For in-app purchases, actions may include software application installs, purchases, finishing a tutorial, and completing a certain percentage of a software application.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of a system 100 for providing programmatic creation and modification of advertising campaigns and ad tests in accordance with one embodiment. The ad system 100 includes an advertising engine 130, processing logic 132, device profiles 134, storage medium 136, an auction system 190, an ad store 150, and a programmatic ad campaign framework 160 for providing programmatic creating and modification of ad campaigns (e.g., ad campaigns for delivering video ads to mobile devices, ad campaigns for delivering video ads to any type of device) and ad tests for determining a user's level of interest in viewing advertisements including ad videos. The auction system 190 may be integrated with the ad system or separate from the ad system. The auction system 190 may include different types of auctions including cost-per-install (CPI), cost-per-click (CPC), cost-per-mille (CPM), CPA, second price auction, and an ad exchange auction. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.). A device profile for a device is based on one or more parameters including location (e.g., GPS coordinates, IP address, cellular triangulation, etc.) of the device, a social profile for a user of the device, and categories or types of applications installed on the device.

A targeting platform 162 includes different parameters for targeting users in ad campaigns and may include one or more performance based algorithms that utilized these different parameters for creating a performance based ad campaign. Alternatively, the performance based algorithms may be included in the ad engine 130 and obtain data from the targeting platform for creating a performance based ad campaign. The parameters include device characteristics (e.g., device id, device age, make and model of a user's device, network connection for user's device, whether user's device is mobile device or tablet device, OS version, volume, screen size and orientation, language setting, etc.) and user characteristics (e.g., user spend, conversion rate, engagement rate, app type, in-app purchase (IAP) activity, etc.) from any source including the system 100, attributers 186, advertisers 184, and publishers 182. The conversion rate may be used to divide users into different groups based on the conversion rate. A category conversion rate can indicate how likely a conversion occurs for a user with a particular app category (e.g., sports games, war games, quest games, newspaper apps, restaurant apps, etc.). An engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. An engagement rate is used to target users having a high ad engagement during ad play events. An engagement rate is used to target users having a high ad engagement during ad play events. An app type may target users having competitor apps installed or users that have a particular "X" app installed. The competitor apps are competitors of publishers or developers that want to advertise to users of the competitor apps. The IAP activity targets users with IAP activity as indicated by user data from the system's 100 data pipeline.

Users with IAP activity can be separated into groups based on spend ranges (e.g., $10-50 range, $50-100 range, $100 or more range, etc.). The device age can be used to target new devices with respect to the system 100. Additional parameters include segments of users such as non-payers versus payers, social influence based on social media data, organic app installs, and life time value (LTV) of a user. The targeting platform is used to support advertisers with complex bid strategies for their user acquisition campaigns.

In one example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.)

may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

High conversion users and high lifetime value users are examples of users having predicted life time values greater than a threshold LTV. High conversion users may convert more than a threshold conversion percentage (e.g., more than 10%, more than 30%, more than 50%, etc.) for an ad campaign. High lifetime value users are predicted to have a LTV greater than a threshold LTV (e.g., greater than $50, greater than $100, etc.) for an ad campaign.

Each device includes a respective advertising services software 103, 105, 107 (e.g., a software development kit (SDK)) that includes a set of software development tools for advertising services including in-app advertising services. The publishers 182 (or developers) publish content along with selling ad space to advertisers. Attributers 186 may install software (e.g., software development kits of publishers) on client devices and track user interactions with publisher and developer applications and advertisements. The attributers can then share this user data and device data with the system 100 and the appropriate publishers and advertisers. The system 100 uses this user and device data for analytics, data science, and return on investment advertising modeling. The system 100, devices 102, 104, 106, advertisers 184, publishers 182, attributers 186, and an ad exchange 195 with third party exchange participants communicate via a network 180 (e.g., Internet, wide area network, WiMax, satellite, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134, make and model of a user's device, network connection for user's device, whether user's device is mobile device or tablet device, OS version, volume, screen size and orientation, language setting, etc.), and user characteristics (e.g., age, gender, ethnicity, location, etc.), etc.

Advertisers 184 or publishers 182 (or developers) can programmatically access the programmatic ad campaign framework 160 for creating and modifying ad campaigns (e.g., ad campaigns for delivering video ads to mobile devices, ad campaigns for delivering video ads to any type of device) and tests of user interest in the ad campaigns via a network 180. The programmatic ad campaign framework 160 includes a testing platform 207 for creating tests (e.g., binary post roll quizzes, level of interest tests, etc.), application programming interfaces (APIs), and implementing components. An API is a set of routines, protocols, and tools for building software applications. The API specifies how software components should interact. The Advertisers 184 or publishers 182 (or developers) obtain programmatic ad campaign software from the system 100 and then use this software for accessing the programmatic ad campaign framework 160. The programmatic ad campaign software sends functions calls with parameters to one or more APIs of the programmatic ad campaign framework 160. These APIs communicate with implementing software components of the framework 160. The implementing software components (e.g., software libraries, testing platform) provide a set of functionalities for creating and modifying ad campaigns and tests. The APIs then send function calls or responses to the programmatic ad campaign software of the advertisers or publishers via network 180. In this manner, the advertisers or publishers can programmatically create and modify ad campaigns and tests using the ad system 100 which has improved computer functionality in the form of the programmatic ad campaign framework based on directly receiving input from the advertisers or publishers for creating a custom test (e.g., binary post roll quizzes, level of interest tests, etc.) for any brand or any type of advertisement. The improved computer functionality provides the ability to scale for operations with a large number of advertisers or publishers for creating different custom tests, aggregate results from different targeted user groups of the custom tests, perform analytics on the test results, compare test results from different tests, compare test results for the same test at different times, and quickly provide meaningful feedback from the users to advertisers or publishers with the programmatic ad campaign framework. The advertisers or publishers can then design more engaging and desired ad campaigns for the users.

In contrast, conventional ad campaigns are created with an advertiser or publisher talking with numerous ad sales, ad development, and ad creative staff for the ad system. The sales, ad development, and ad creative staff must then use different internal tools of the ad system to create the ad campaign or tests for the advertiser or publisher. The advertiser or publisher then needs to review the created ad campaign or tests and provide feedback for revisions of the ad campaign or tests. The ad system works in a more efficient and streamlined manner based on the advertisers and publishers being able to directly access the ad tools of the ad system.

In one embodiment, the system 100 includes a storage medium 136 to store one or more software programs. In one embodiment, a system includes an advertising campaign framework having a testing platform, one or more application programming interfaces (APIs), and software components including one or more software programs and software code libraries. A storage medium stores instructions of the testing platform, one or more APIs, and software components. Processing logic is coupled to the storage medium. The processing logic is configured to execute the instructions to receive a function call from an ad campaign software of an advertising entity, to provide a set of functionality for programmatically creating one or more tests to be displayed within an initiated software application of a user during an ad campaign to determine user attention during the test, and to generate a response that is sent to the ad campaign software of the advertising entity. The response includes one or more function calls with parameters including cost information for a type of ad campaign and a type of test in response to the function call received from the ad campaign software.

Figure 2:
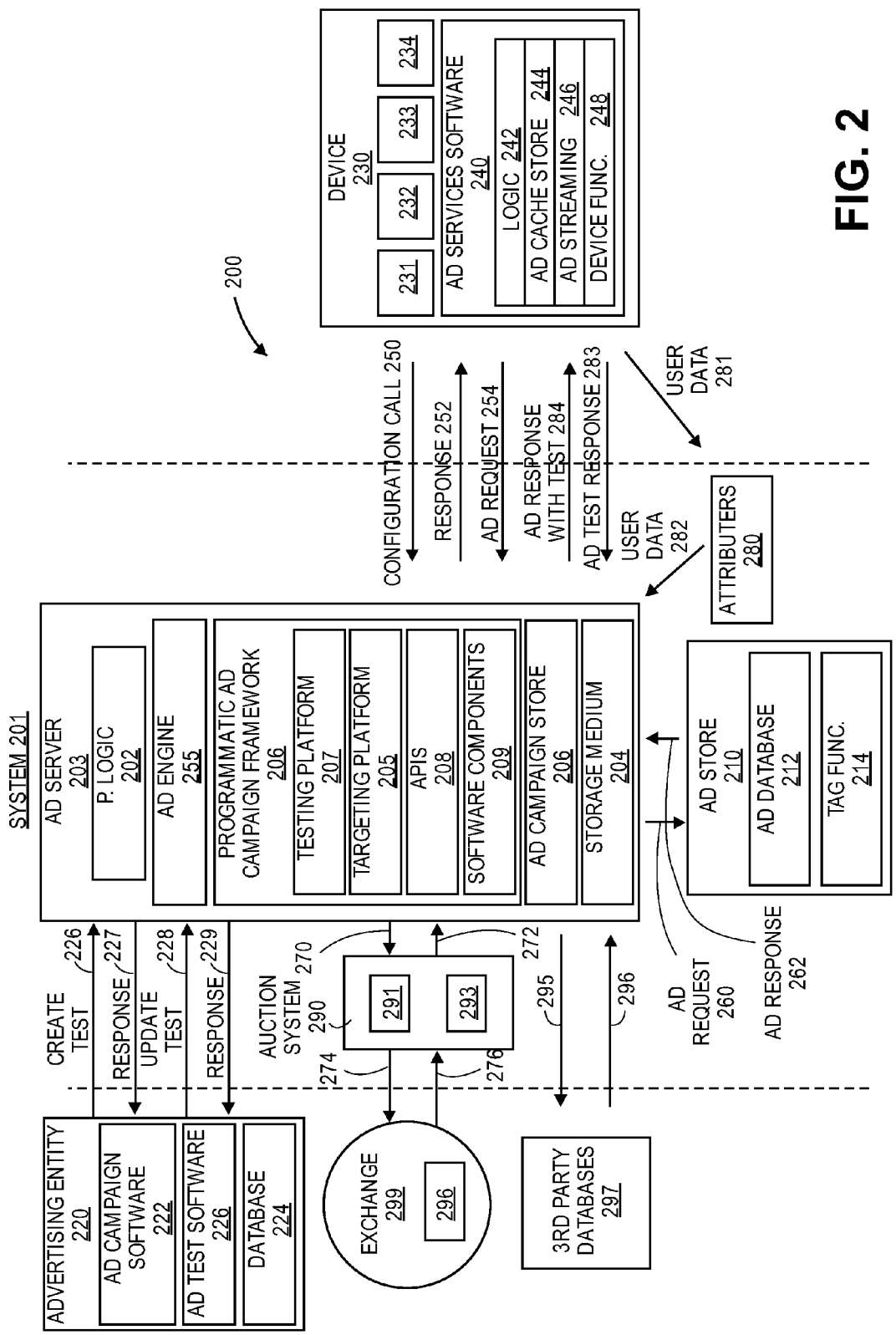
FIG. 2 illustrates a flow diagram of operations for providing programmatic creation and modification of tests of user attention for viewing advertising campaigns in accordance with one embodiment.

FIG. 2 illustrates a flow diagram of operations for providing programmatic creation and modification of tests of user attention for viewing advertising campaigns in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200.

An advertising entity (e.g., advertiser, ad agency, publisher, developer, etc.) 220 uses ad campaign software 222 for creating and modifying advertising campaigns (e.g., ad campaigns for delivering video ads to mobile devices, ad campaigns for delivering video ads to any type of device (e.g., source device, client device, mobile phone, tablet device, lap top, computer, connected or hybrid television (TV), IPTV, Internet TV, Web TV, smart TV, smart appliance (e.g., refrigerator, washing machine, dryer, etc))) and tests of user attention for viewing these ad campaigns. The ad campaign software 222 sends a function call 230 (e.g., create ad test function call, create campaign function call, create ad campaign and ad test function call(s)) to the system 201 at operation 230. The function call includes different parameters including an identification for identifying the advertising entity and at least one of an identification for identifying an ad campaign to be created or an identification for identifying an ad test to be created. One or more APIs 208 of the programmatic ad campaign framework 207 receives the function call from the ad campaign software 222. For an ad test, parameters of the function call and data control information are transferred to software components 209 or testing platform 207, which respond by providing a set of functionality for creating the ad test. For an ad campaign, parameters of the function call and data control information may also transferred to software components 209, which respond by providing a set of functionality for creating an ad campaign.

A response is sent from the one or more APIs to the ad campaign software 222 at operation 227. The response includes one or more function calls with return values and parameters in response to the function call received from the ad campaign software. The parameters of the response may include an identification of one or more ad test, an identification of the ad campaign (e.g., ad campaign 1), features or functions of the one or more tests, and features or functions of the ad campaign. The ad campaign software 222 will display a user interface or dashboard for customizing the ad tests. The ad campaign software 222 may also display a user interface or dashboard for customizing the ad campaign. The created ad tests can be saved in the database 224, the testing platform 207, and also in the ad campaign store 206. The created ad campaign can be saved in the database 224 and also in the ad campaign store 206. The ad tests can be integrated with the ad campaigns or separate from the ad campaigns. The ad tests and campaigns may utilize ads from any source including database 224, an ad store 210, third party databases 297, etc. The ad campaign framework 207 includes inversion of control such that an overall program flow is dictated by the framework not the caller (e.g., advertising entity). The framework also includes default behavior and can be extended by a user to provide specific functionality. The framework includes non-modifiable framework code that is not to be modified but does allow user-implemented extensions.

The ad campaign software 222 can also update an ad test or ad campaign at operation 228 by sending a function call (e.g., update ad test function call, update campaign function call) to the system 201. One or more APIs 208 of the programmatic ad campaign framework 206 receives the function call from the ad campaign software 222. Parameters of the function call and data control information are transferred to the software components 209 or testing platform 207, which respond by providing a set of functionality for updating at least one of the ad tests and ad campaigns. A response is sent from the one or more APIs to the ad campaign software 222 at operation 229. The response includes one or more function calls with return values and parameters in response to the function call received from the ad campaign software. The parameters of the response may include an identification of the ad test, features or functions of the ad test, an identification of the ad campaign (e.g., ad campaign 1.1), and features or functions of the ad campaign.

A targeting platform 205 may be integrated with the ad campaign framework 206 or separate from the ad campaign framework 206. The targeting platform includes different parameters for targeting users in ad campaigns and may include one or more performance based algorithms that utilize these different parameters for creating an ad campaign. Alternatively, the performance based algorithms may be located in the ad engine 255. For example, the ad campaign framework 206 may access data, parameters, or algorithms from the targeting platform or ad engine for creating and modifying ad campaigns. The parameters include device characteristics (e.g., device id, device age, make and model of a user's device, network connection for user's device, whether user's device is mobile device or tablet device, OS version, volume, screen size and orientation, language setting, etc.) and user characteristics (e.g., user spend, conversion rate, engagement rate, app type, IAP activity, etc.) from any source including the system 100, attributers 186, advertisers 184, and publishers 182. Additional parameters include segments of users such as non-payers versus payers, social influence based on social media data, organic app installs, and life time value (LTV) of a user.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, 5G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ad campaigns with one or more tests to devices using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app, user characteristics, device characteristics (e.g., device id, make and model of a user's device, network connection for user's device, whether user's device is mobile device or tablet device, OS version, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application), and cache information. The ad server processes the ad request to determine an ad format and timing placement (e.g., an optimal ad format in terms of likelihood of converting, an optimal timing placement in terms of likelihood of converting) of at least one ad or interstitial ad played in-app based on the information contained in the predictive ad request. The ad server determines an ad format and timing placement that is most likely to convert or generate revenue for a publisher or a developer. The ad server also determines a type of test (e.g., binary post roll quizzes, level of interest tests, etc.) for determining user attention in viewing a video ad for an ad campaign.

Attributers 280 may have software (e.g., a SDK of the publisher of the application) installed on the user's device in order to obtain third party user data (e.g., user data 281 from the device 230). This user data may include tracking of a user's interaction and engagement with the software application, ad campaigns, and ad tests. The user data may also include a length of time that the application is installed, an amount of purchases from the application, and buying patterns in terms of which products or services are purchased and when these products or services are purchased. The user data may also include monitoring target goals for how the user engages with the application. The user data (e.g., user data 282) can be shared with system 201, publishers, and advertisers.

The ad server also processes the ad request (or predictive ad request) and accesses at least one of the ad store 210 and the exchange 299 for options 2-8 of the at least one configuration file to obtain at least one ad or ad campaign that is likely or most likely to convert. The ad or ad campaign may include one or more tests to be displayed to the user within the software application (e.g., an opt-in ad interstitial). The ad server may determine which option of options 1-8 will be processed or enabled for processing the ad request (or predictive ad request) based on one or more configurable parameters. Alternatively, the device or user may determine which option of options 1-8 will be processed or enabled based on these parameters.

For option 1, the device plays at least one ad from cache. For options that access the ad store 210, at operation 260, the processing logic 202 sends an ad call or request (or a predictive ad call or request) to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request (or predictive ad call or request). The ad response includes a payload with one or more potential ads or ads campaigns and possibly one or more ad tests for being streamed to the device 230 or optionally an ad serving tag for accessing one or more third party ad databases 297. If the ad server receives an ad serving tag, then the ad server sends an ad request (or predictive ad request) to the third party database at operation 295 and receives an ad response (or predictive ad response) at operation 296 from the third party database 297. The ad response from the ad store or the third party databases 297 includes one or more ads or ad campaigns and possibly one or more ad tests for being sent or streamed to the device 230. The processing logic 202 decides whether to stream at least one ad or ad campaign and one or more ad tests to the device 230 based on the determined or selected option of the at least one configurable file.

The ad server upon processing an ad request (or a predictive ad request) may access the exchange 299 given certain options (e.g., options 3, 4, 7, and 8) of the at least one configuration file. In this case, the ad server sends an exchange request (or a predictive exchange request 270) to the auction system 290 having an auction engine 291 and database 293 prior to a predicted ad play event or actual ad play event on the device. Alternatively, the auction system is integrated with the ad system 201. The auction engine 291 processes the ad exchange request 270 and generates an auction based on different business rules including at least one of a price (e.g., a floor or lowest price for the ad or ad campaign), inventory allocation, and participants who can participate in the auction.

In one embodiment, the auction is a second price auction in which each participants gives their highest price (e.g., $10 per app install) and the highest bidder pays the price of the second highest bidder (e.g., $8 per app install). The advantage of this monetization model is that advertisers only bid the maximum that they are willing to pay for a set of conditions. In the scenario where another bidder's maximum price is significantly lower, the highest bidder only gets charged the second highest price of the auction. This encourages advertisers to bid actual or real market value for inventory while giving advertisers a chance to spend significantly less.

The auction determines which participant can provide a better ad for the device in a timely manner. At operation 274, the auction system 290 sends an ad exchange request (or a predictive ad exchange request to each participant of the auction). The ad exchange request (or predictive ad exchange request) includes configurable parameters including at least one of ad length, one or more ad tests, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response (or a predictive ad exchange response) at operation 276. The auction engine processes the ad exchange responses (or predictive ad exchange responses) (bids) and determines which participant(s) if any will serve a better ad for playing on the device for an actual ad play event (or a predicted ad play event). The responses and ads from the participants can be saved in the database 293. At operation 272, an ad response (or a predictive ad response) is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 284, the ad server can then select at least one better ad from the ad store, a participant with a winning or selected bid from the exchange, a cached ad on the device, or optionally a third party database 297 that has not participated in the exchange. A better ad is anticipated to be more likely to convert or have a higher likelihood of obtaining a user interaction than the cached ad on the device. The at least one better ad and one or more ad tests if selected are then cached on the device or streamed to the device and played during the actual ad play event or a predicted ad play event that has been predicted to occur.

Figure 3:
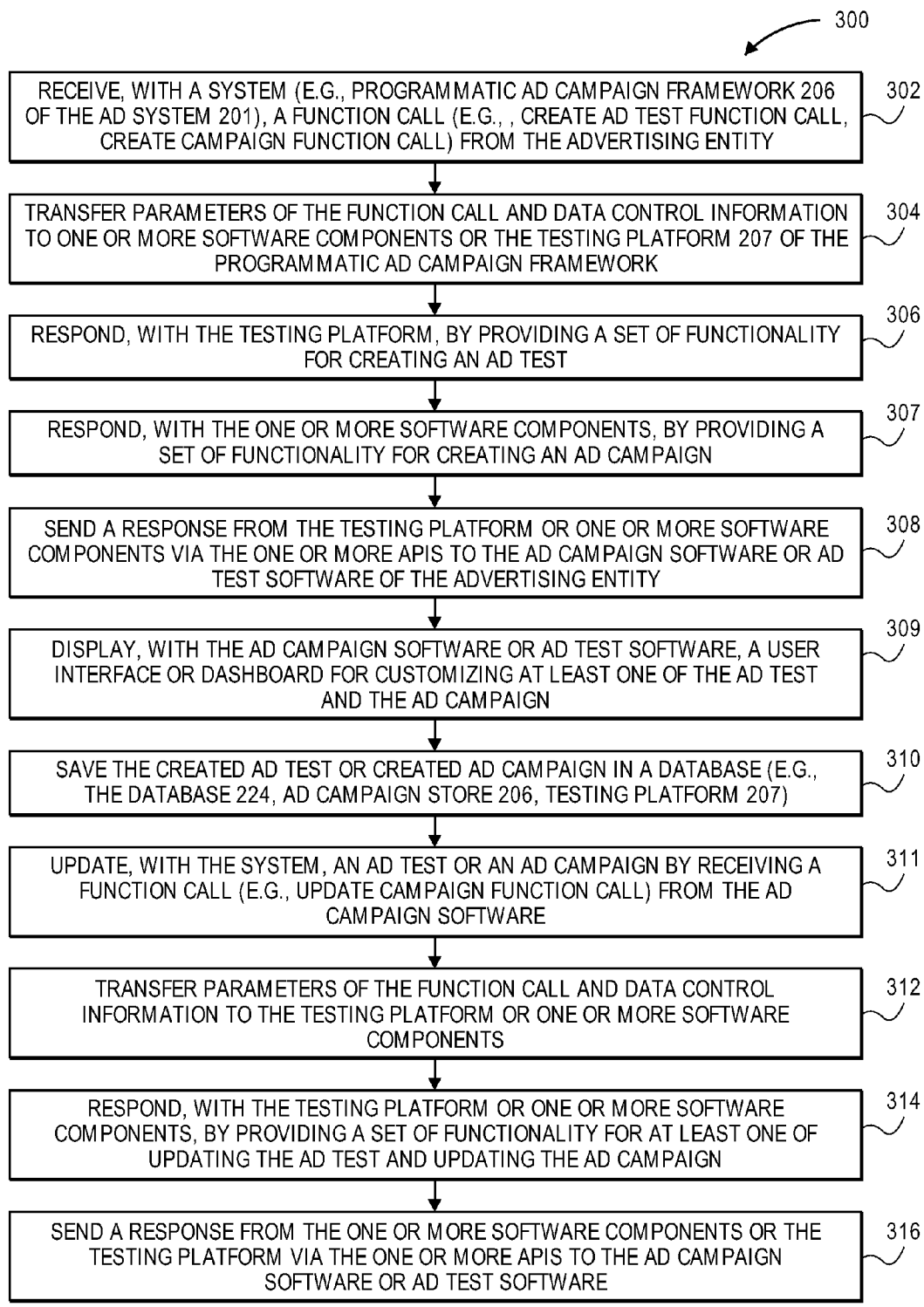
FIG. 3 illustrates a flow diagram of operations for a method of providing programmatic creation and modification of ad tests in accordance with one embodiment.

FIG. 3 illustrates a flow diagram of operations for a method of providing programmatic creation and modification of ad tests in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300 by executing instructions (e.g., framework code) of a programmatic ad campaign framework.

An advertising entity (e.g., advertiser, ad agency, publisher, developer, etc.) 220 uses ad campaign software 222 (or ad test software 226) to access the programmatic ad campaign framework for creating and modifying ad tests (e.g., binary post roll quizzes, level of interest tests, etc.) and advertising campaigns (e.g., ad campaigns for delivering video ads to mobile devices, ad campaigns for delivering video ads to any type of device). A system (e.g., programmatic ad campaign framework 206 of the ad system 201) receives a function call (e.g., create ad test function call, create campaign function call) from the advertising entity at operation 302. The advertising entity may be using ad campaign software 222 or ad test software 226 that can be integrated with the ad campaign software or separate from the ad campaign software. The function call includes different parameters including an identification for identifying the advertising entity, an identification for identifying an ad test, and an identification for identifying an ad campaign to be created. One or more APIs of the programmatic ad campaign framework of the system receives the function call. Parameters of the function call and data control information are transferred to one or more software components or the testing platform 207 of the programmatic ad campaign framework at operation 304. The testing platform responds by providing a set of functionality for creating an ad test at operation 306. The software component(s) may also respond by providing a set of functionality for creating an ad campaign at operation 307. The set of functionality may include different parameters based on user or device characteristics including type of ad test, an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, etc. Any of the parameters included in the testing platform may also be accessed and provided as the set of functionality. A response is sent from the testing platform via the one or more APIs to the ad campaign software or ad test software of the advertising entity at operation 308. A response may also be sent from the software component(s) via the one or more APIs to the ad campaign software of the advertising entity at operation 308.

The response includes one or more function calls with return values and parameters in response to the function call received from the ad campaign software or ad test software. The parameters of the response may include an identification of an ad test, an identification of the ad campaign (e.g., ad campaign 1), features or functions of the ad test, and features or functions of the ad campaign. The ad campaign software or ad test software will display a user interface or dashboard for customizing at least one of the ad test and the ad campaign at operation 309. The created ad test or created ad campaign can be saved in a database (e.g., the database 224, ad campaign store 206, testing platform 207) at operation 310. The ad campaign and ad test may utilize ads and ad tests from any source including database 224, an ad store 210, third party databases 297, etc.

The system can also update an ad test or an ad campaign at operation 311 by receiving a function call (e.g., update ad test functional call, update campaign function call) from the ad campaign software. One or more APIs of the programmatic ad campaign framework receives the function call from the ad test software 226 or ad campaign software 222. Parameters of the function call and data control information are transferred to the testing platform or one or more software components at operation 312. The testing platform or one or more software components respond by providing a set of functionality for at least one of updating the ad test and updating the ad campaign at operation 314. The set of functionality to be updated may include any of the parameters discussed herein including a type of ad test, format of ad test, questions of the ad test, placement of ad test within ad campaign, type of video ad for the ad test, volume settings during the ad test, levels of difficulty for ad test based on user characteristics (e.g., age, gender, ethnicity, etc.), an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, etc. A response is sent from the one or more software components or testing platform via the one or more APIs to the ad campaign software at operation 316. The response includes one or more function calls with return values and parameters in response to the function call received from the ad campaign software or ad test software. The parameters of the response may include an identification of the ad test, an identification of the ad campaign (e.g., ad campaign 1.1), features and functions of the ad test, and features or functions of the ad campaign.

Figure 4:
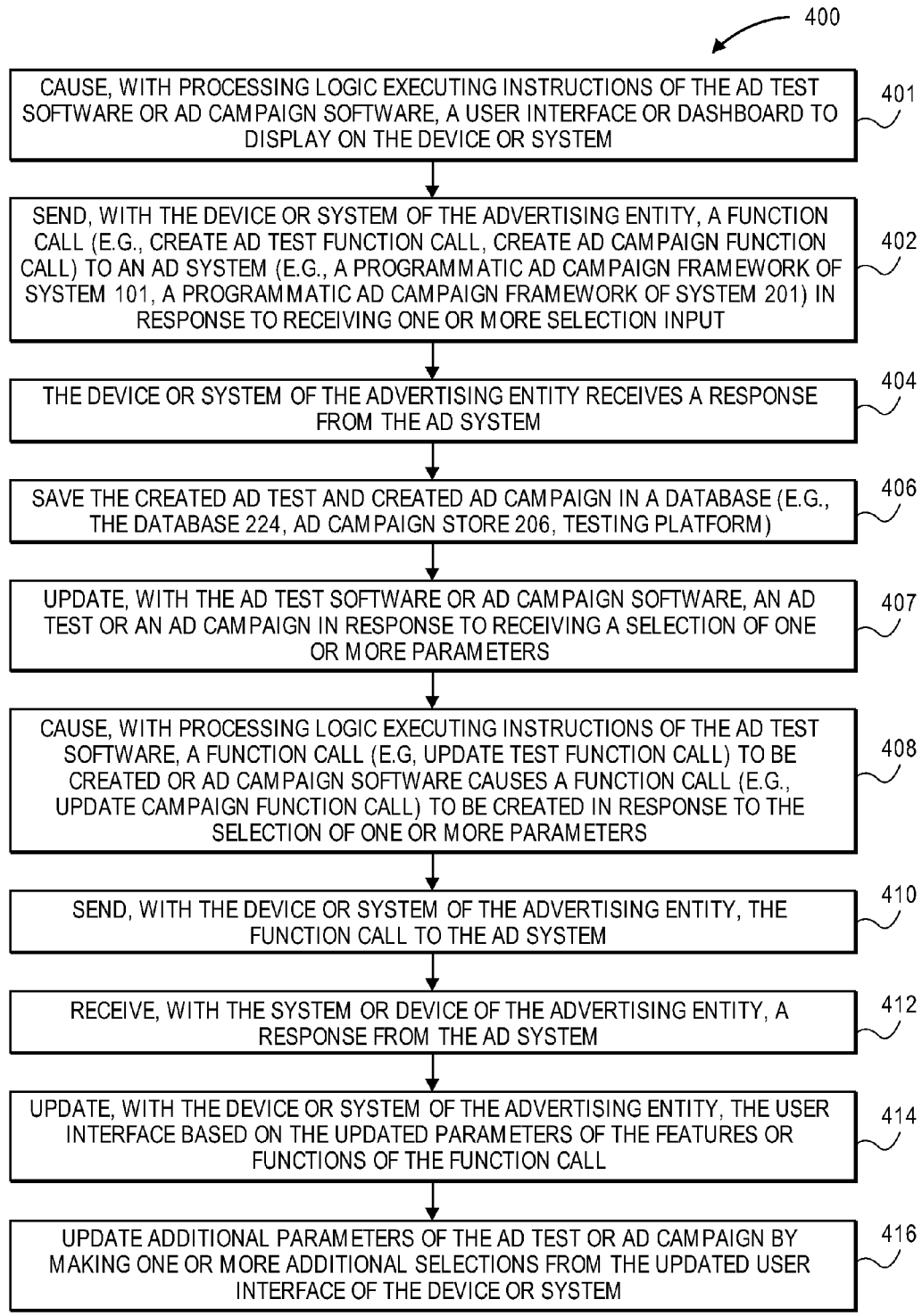
FIG. 4 illustrates a flow diagram of operations for a method of providing programmatic creation and modification of ad tests in accordance with one embodiment.

FIG. 4 illustrates a flow diagram of operations for a method of providing programmatic creation and modification of ad tests in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device or system of an advertising entity executes instructions of ad test software or an ad campaign software to perform at least some of the operations of method 400.

In one embodiment, an advertising entity uses ad test software or ad campaign software (e.g., ad campaign software 222) installed on a device or a system for creating and modifying ad tests or creating and modifying advertising campaigns (e.g., ad campaigns for delivering video ads to mobile devices, ad campaigns for delivering video ads to any type of device). Processing logic executes instructions of the ad test software or ad campaign software to cause a user interface or dashboard to display on the device or system at operation 401. The user interface allows for customizing at least one of the ad test and the ad campaign and for receiving one or more selection input of one or more different types of ad tests, ad campaigns, one or more parameters of ad tests, and one more parameters of the ad campaigns. For example, a user of the ad test software or ad campaign software of the advertising entity selects one or more options for creating the ad test. The user can select an option to create a new ad test or the user can select an existing ad test possibly from a list or arrangement of existing ad tests to be used as a template for creating a customized ad test.

The device or system of the advertising entity sends a function call (e.g., create ad test function call 226, create ad campaign function call) to an ad system (e.g., a programmatic ad campaign framework of system 101, a programmatic ad campaign framework of system 201) at operation 402 in response to receiving one or more selection input. The advertising entity may be using ad test software 226 or ad campaign software 222. The function call includes different parameters including an identification for identifying the ad test, an identification for identifying the advertising entity and an identification for identifying an ad campaign to be created. One or more APIs of a programmatic ad campaign framework of the ad system receives the function call. Parameters of the function call and data control information are transferred to one or more software components or the testing platform of the programmatic ad campaign framework. The testing platform responds by providing a set of functionality for creating an ad test. The one or more software components respond by providing a set of functionality for creating an ad campaign. The set of functionality may include a type of ad test, format of ad test, questions of the ad test, placement of ad test within ad campaign, type of video ad for the ad test, volume settings during the ad test, a level of difficulty for the ad test based on user characteristics (e.g., age, gender, anticipated interest level for the ad, etc.), an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, etc. The device or system of the advertising entity receives a response from the ad system at operation 404. For example, the response is received from the one or more software components via the one or more APIs at operation 404.

The response includes one or more function calls with return values and parameters in response to the function call sent from the ad test software or ad campaign software. The parameters of the response may include an identification of the ad test, an identification of the ad campaign (e.g., ad campaign 1), features or functions of the ad test, and features or functions of the ad campaign. The created ad test and created ad campaign can be saved in a database (e.g., the database 224, ad campaign store 206, testing platform) at operation 406. The ad campaign may utilize ad tests and ads from any source including database 224, an ad store 210, third party databases 297, etc.

The ad test software or ad campaign software can also update an ad test or an ad campaign in response to receiving a selection of one or more parameters at operation 407. Processing logic executing instructions of the ad test software causes a function call (e.g, update test function call) to be created or processing logic executing instructions of the ad campaign software causes a function call (e.g., update campaign function call) to be created at operation 408 in response to the selection of one or more parameters. The device or system of the advertising entity sends the function call to the ad system at operation 410. One or more APIs of the programmatic ad campaign framework receives the function call from the ad test software 226 or ad campaign software 222. Parameters of the function call and data control information are transferred to the one or more software components or the testing platform. The testing platform responds by providing a set of functionality for updating the ad test. The one or more software components respond by providing a set of functionality for updating the ad campaign. The set of functionality to be updated may include a type of ad test, format of ad test, questions of the ad test, placement of ad test within ad campaign, type of video ad for the ad test, volume settings during the ad test, a level of difficulty for the ad test based on user characteristics, an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, etc. The system or device of the advertising entity receives with the ad test software or ad campaign software a response from the ad system at operation 412. The one or more software components or testing platform via the one or more APIs provide the response. The response includes one or more function calls with return values and parameters in response to the function call received from the ad test software or ad campaign software. The parameters of the response may include an identification of the ad test, an identification of the ad campaign (e.g., ad campaign 1.1), features or functions of the ad test to be updated, and features or functions of the ad campaign to be updated. The device or system of the advertising entity updates the user interface based on the updated parameters of the features or functions of the function call at operation 414. The user of the device or system can update additional parameters of the ad test or ad campaign by making one or more additional selections from the updated user interface of the device or system at operation 416.

Figure 5:
FIG. 5 illustrates an exemplary user interface for programmatic creation of ad tests in accordance with one embodiment.

FIG. 5 illustrates an exemplary user interface for programmatic creation of ad tests in accordance with one embodiment. The user interface 500 occurs after an advertiser (or ad agency or publisher or developer) has initiated ad test software or ad campaign software installed on a device or a system. The user interface 500 includes an ad test region 510 for selecting one or more ad tests (e.g., ad tests for delivering video ads to mobile devices, ad tests for delivering video ads to any type of device) including ad tests 512, 514, 516, 518, and n. Each ad test is associated with a selectable ad campaign option or cost information option including cost information option 522, ad campaign option 524, ad campaign option 526, cost information option 528, and cost information option n. For example, cost information option 522 may be a $5 cost information for CPI on a certain OS type, ad campaign option 524 include a $7 cost information for CPCV on a certain OS type, ad campaign option 526 may include cost information for CPM on a certain OS type, cost information option 528 may be a $15 cost information for CPI on a certain OS type, and cost information option n may be a $20 cost information for CPI on a certain OS type. In another embodiment, the OS type is a separate function with selectable options.

The function 530 includes selectable ad type options 532, 534, 536, 538, and n. For example, ad type 532 may be a binary post roll quiz type for determining whether a user watched and understand a video ad. The user if answering questions correctly will be considered attentive and scored as a 1 while a user that fails to answer questions correctly after having viewed the video will considered non-attentive and scored as a 0. Ad type 534 may be a level of attentiveness test or quiz to determine how attentive the user was while watching a video ad or viewing an advertisement. Function 540 includes question(s) options 542, 544, 546, 548, and n for creating different kinds of customized questions to test a user's level of attentiveness while watching a video ad.

In one embodiment, the function 560 includes an attentiveness option that displays an amount or percentage of viewers that have viewed the test ad and responded correctly to the one or more test question(s). For example, a brand (e.g., beverage company) may display a video ad for the brand and then ask after the video ad if the beverage or bottle holding the beverage in the video ad had a certain color, shape, or other distinguishing characteristic. The user then answers the question in order to test the user's engagement or attentiveness during the display of the video ad. The function n includes placement options 552, 554, 556, 558, n for a timing placement of an ad test within an ad campaign. For example, the ad test may be an opt-in ad interstitial of an ad campaign, the ad test may be one of the first video ads of the campaign, the ad test may be one of the last video ads of the campaign, etc.

Figure 6:
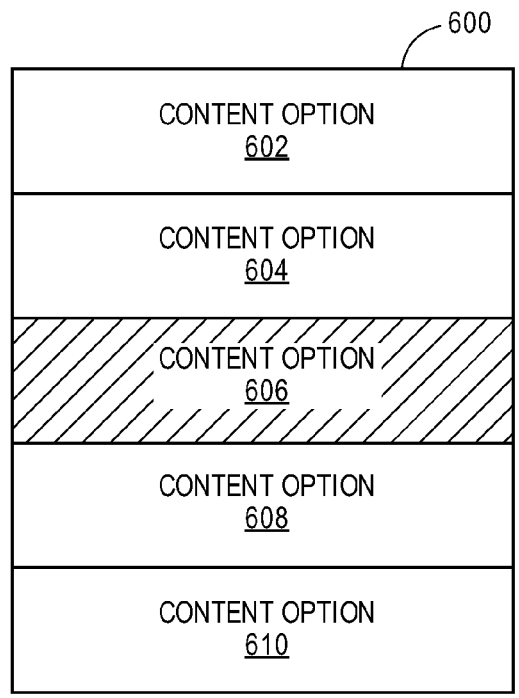
FIG. 6 illustrates an exemplary user interface for showing selecting options as presented by a publisher or content provider in accordance with one embodiment.
Figure 7:
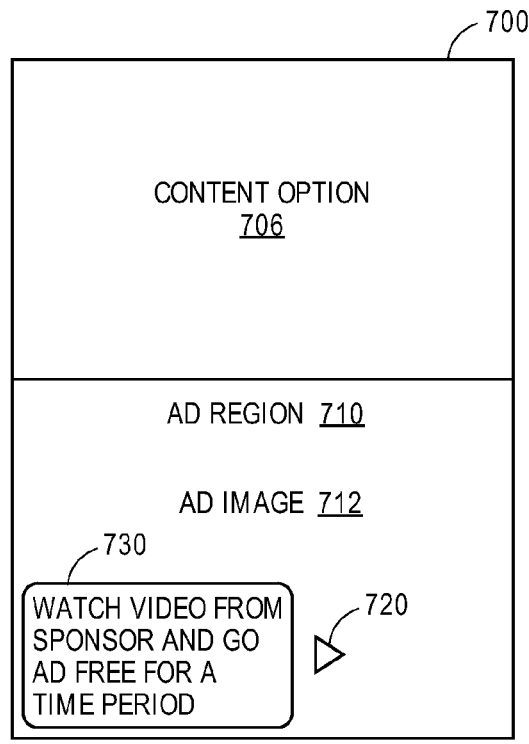
FIG. 7 illustrates an exemplary user interface for initiating an ad test that includes a video ad in accordance with one embodiment.
Figure 8:
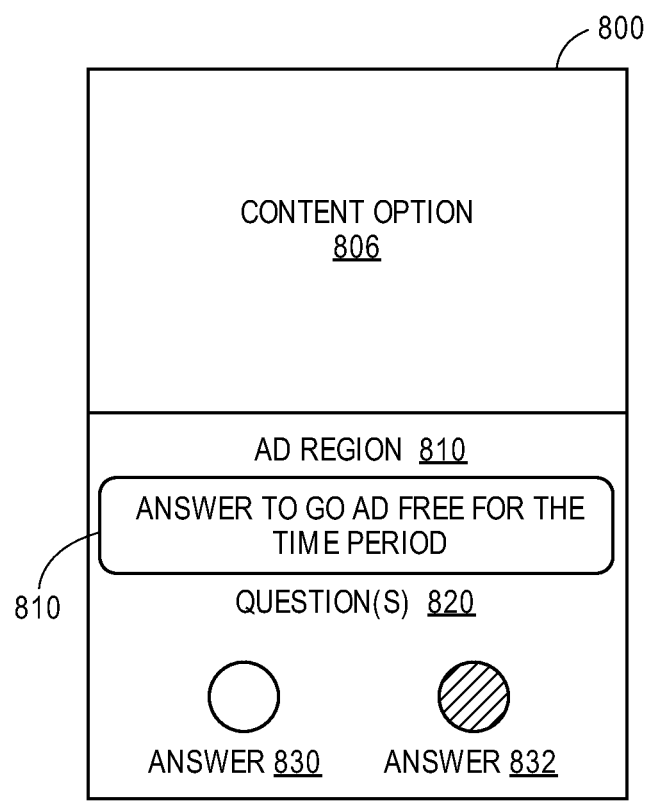
FIG. 8 illustrates an exemplary user interface of an ad test or quiz after a user has viewed an ad video in accordance with one embodiment.

In one embodiment, FIGS. 6-8 illustrates a sequence of user interfaces for a user viewing content from a publisher and then receiving an ad test that includes a video ad followed by a question. Advertisers (e.g., brand advertisers) typically purchase ads based on a completed view rate as the key metric that determines a cost for the ads. However, ad placements on mobile devices are typically opt in or forced. The advertisers do not know if a user is actually engaged and viewing the ad or ignoring the ad because it was forced on their device. The post ad test or quiz allows the advertiser to learn whether the user is engaged and watching the ad or not. The results of the post ad test or quiz allow the advertisers to learn whether ads are effective in engaging a user's attention while viewing the video ad.

FIG. 6 illustrates an exemplary user interface for showing selecting options as presented by a publisher or content provider in accordance with one embodiment. The user interface 600 includes selectable content options 602, 604, 606, 608, and 610. The content may be any type of content including news, sports, games, fashion, shopping, entertainment, etc. A user can select the option 606 as indicated by the shading of option 606.

FIG. 7 illustrates an exemplary user interface for initiating an ad test that includes a video ad in accordance with one embodiment. The user interface 700 is generating in response to the user selecting the content option 606 from user interface 600. The content option 706 includes an expanding view of the content option 606 and includes the content being requested by the user. The ad region 710 may include an opt-in ad that allows the user to decide whether to view the video for the advertiser or brand. Alternatively, the ad region 710 may include a forced ad that is automatically displayed to the user without receiving user input. The ad region 710 may include ad image(s) 712 (e.g., brand ad, performance ad) or any type of ad content and a region 730 that includes text that describes the option of watching the video ad by selecting play option 720. In exchange for watching the video ad from the sponsor (e.g., advertiser, brand ad, etc.), the publisher or content provider will provide content with no ads for a certain time period (e.g., 4 hours, 24 hours, 3 days, etc.). In another example, the publisher, content provider, or sponsor may provide rewards or incentives in exchange for viewing the ad video. In one example, the user can select the content option 706 in order to receive the requested content without viewing the ad video or the user can select the play option 720 to view the ad video of the sponsor.

In one example, the video ad is for an advertiser (e.g., brand automobile company). The ad video shows an automobile of the brand automobile company that is being followed by police men driving motorcycles. The police men follow the automobile to the home of the driver of the automobile. The police men were supposed to be escorting a government official. However, when the driver of the automobile exits the automobile, the police men then realize that the driver of the automobile is not the government official to be escorted and they have mistakenly followed the wrong automobile.

FIG. 8 illustrates an exemplary user interface of an ad test or quiz after a user has viewed an video ad in accordance with one embodiment. The user interface 800 includes a content option 806 which may include similar content in comparison to option 706 and option 606. The user interface 800 also includes an ad region 810 that can include one or more UI elements. In one example, a text region 812 includes text (e.g., Answer to go Ad free for the time period (e.g., 4 hours, 24 hours, 3 days, etc.)). One or more question(s) 820 then test for a user's level of attentiveness while viewing the ad video. The test can be a binary test if the question is either correct or incorrect. For example, the question 820 may ask "what was the color of the car" in the video ad. Answer 830 may be an incorrect answer (e.g., red) and answer 832 may be a correct answer (e.g., black). If the user answers incorrectly then the user may be given the opportunity to view the same ad video or a different ad video. If the user correctly answers a question after viewing the same video again or a different video, then the user may be to receive the content with no ads for the time period.

If the user answers correctly (e.g., selects answer 832 as indicated by shading in FIG. 8) after viewing the ad video an initial time, then the user can return to the content of the publisher or content provider and receives this content with no ads for the time period (e.g., 4 hours, 24 hours, 3 days, etc.). In another example, the publisher, content provider, or sponsor may provide rewards or incentives in exchange for viewing the ad video rather than no ads for a certain time period.

In another embodiment, the test is a non-binary test that can indicate relative levels of interest based on the answer(s) of one or more questions. The levels of interest or levels of engagement may be numeric (e.g., 1 to 5) or relative such as high, medium, or low engagement level.

Figure 9:
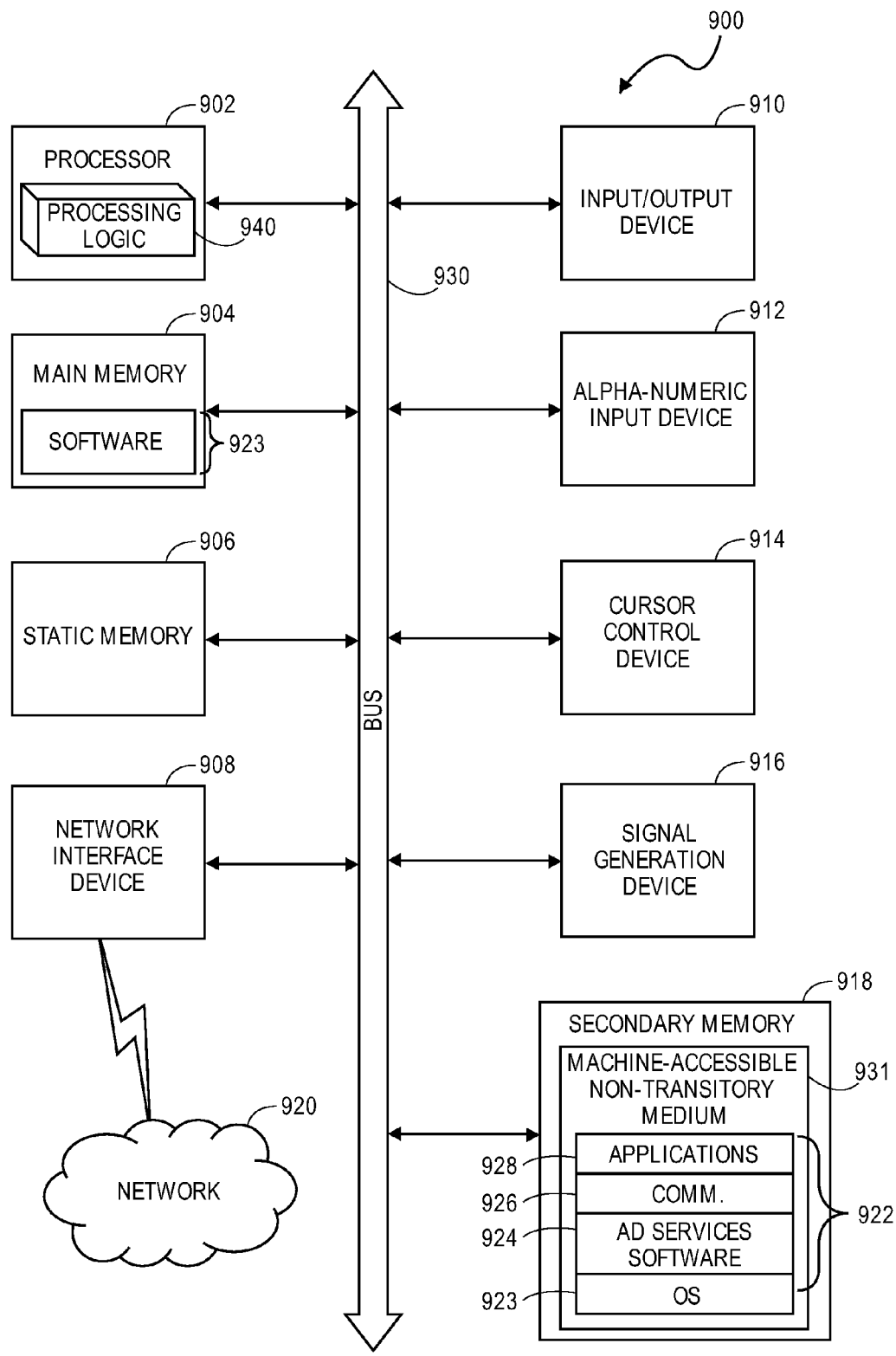
FIG. 9 illustrates a diagrammatic representation of a machine in the exemplary form of a device 900 within which a set of instructions, for causing the machine to perform any one or more of the methodologies discussed herein, may be executed in accordance with one embodiment.

FIG. 9 illustrates a diagrammatic representation of a machine in the exemplary form of a computer system or device 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as one or more microprocessors, central processing units, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The device 900 may further include a network interface device 908 that may include RF circuitry for sending and receiving RF cellular signals, a wireless transceiver for WiFi, a USB component, a NFC component, or any other communications component for sending and receiving communications. The device 900 also may include an input/output device 910 (e.g., a display, a liquid crystal display (LCD), a plasma display, a cathode ray tube (CRT), touch display device, or touch screen for receiving user input and displaying output), an optional alphanumeric input device 912 (e.g., a keyboard), an optional cursor control device 914 (e.g., a mouse), and a signal generation device 916 (e.g., a speaker).

The data storage device 918 may include a machine-accessible non-transitory medium 931 on which is stored one or more sets of instructions (e.g., software 922) embodying any one or more of the methodologies or functions described herein. The software 922 may include an operating system 923, advertising services software 924 (e.g., SDK 924), communications module 926, and applications 928 (e.g., publisher applications). The software 922 may also reside, completely or at least partially, within the main memory 904 (e.g., software 923) and/or within the processor 902 during execution thereof by the device 900, the main memory 904 and the processor 902 also constituting machine-accessible storage media. The software 922 or 923 may further be transmitted or received over a network 920 via the network interface device 908.

The machine-accessible non-transitory medium 931 may also be used to store data structure sets that define user identifying states and user preferences that define user profiles. Data structure sets and user profiles may also be stored in other sections of device 900, such as static memory 906.

Figure 10:
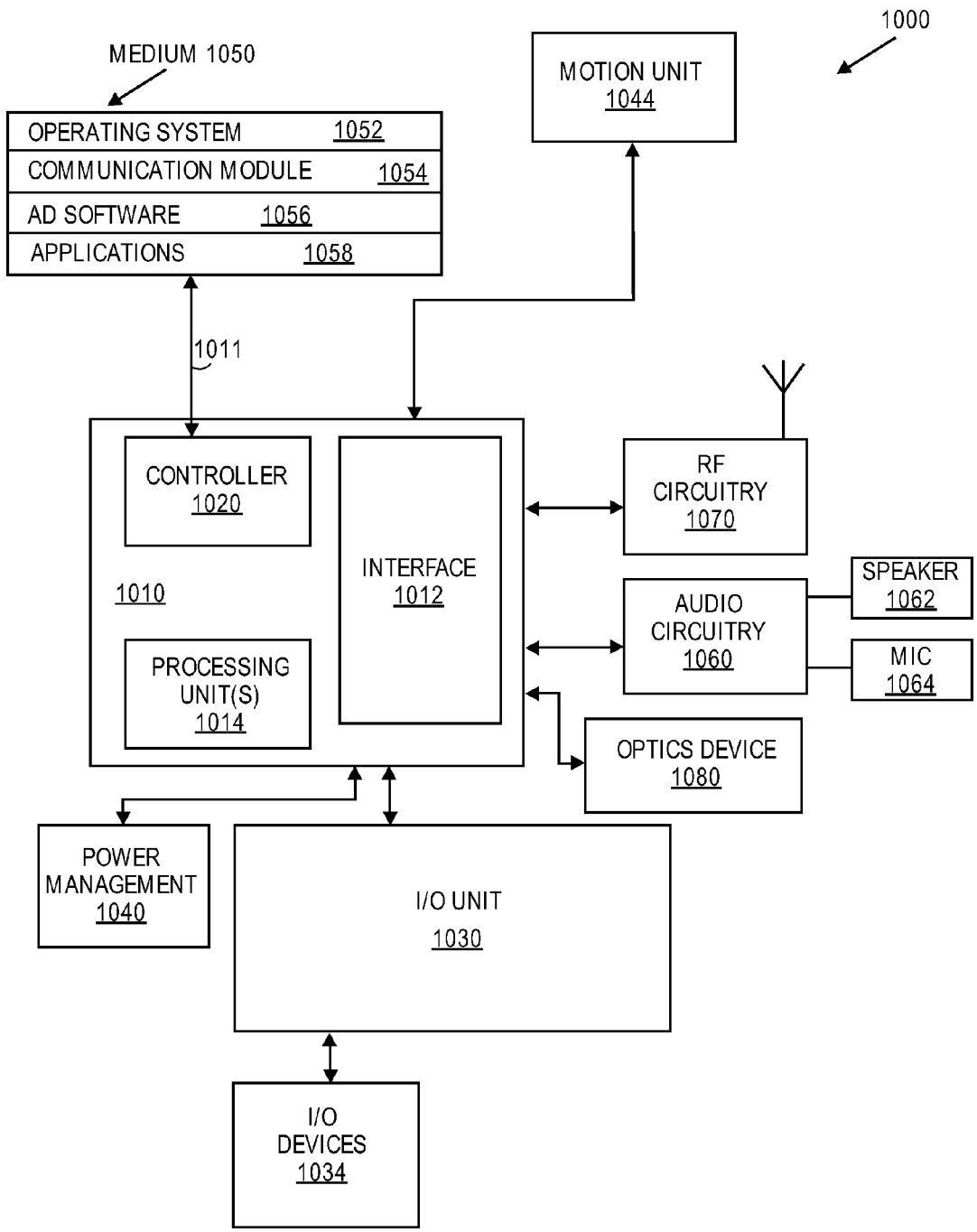
FIG. 10 is a block diagram of a wireless device 1000 in accordance with one embodiment.

FIG. 10 is a block diagram of a wireless device 1000 in accordance with one embodiment. The wireless device 1000 may be any type of wireless device (e.g., cellular phone, wireless phone, tablet, etc.) for sending and receiving wireless communications. The wireless device includes a processing system 1010 that includes a controller 1020 and processing units 1014. The processing system 1010 communicates with an Input/Output (I/O) unit 1030, radio frequency (RF) circuitry 1070, audio circuitry 1060, an optics device 1060 for capturing one or more images or video, a motion unit 1044 (e.g, an accelerometer, gyroscope, etc.) for determining motion data (e.g., in three dimensions) for the wireless device 1000, power management system 1040, and machine-accessible non-transitory medium 1050. These components are coupled by one or more communication links or signal lines.

RF circuitry 1070 is used to send and receive information over a wireless link or network to one or more other devices. Audio circuitry 1060 is coupled to audio speaker 1062 and microphone 1064 and includes known circuitry for processing voice signals.

One or more processing units 1014 communicate with one or more machine-accessible non-transitory mediums 1050 (e.g., computer-readable medium) via controller 1020. Medium 1050 can be any device or medium (e.g., storage device, storage medium) that can store code and/or data for use by one or more processing units 1014. Medium 1050 can include a memory hierarchy, including but not limited to cache, main memory and secondary memory. The medium 1050 stores one or more sets of instructions (or software) embodying any one or more of the methodologies or functions described herein. The software may include an operating system 1052, advertising services software 1056 (e.g., SDK 1056), communications module 1054, and applications 1058 (e.g., publisher applications, developer applications, a web browser, html5 applications, etc.). The software may also reside, completely or at least partially, within the medium 1050 or within the processing units 1014 during execution thereof by the device 1000. The components shown in FIG. 10 may be implemented in hardware, software, firmware or any combination thereof, including one or more signal processing and/or application specific integrated circuits.

Communication module 1054 enables communication with other devices. The I/O unit 1030 communicates with different types of input/output (I/O) devices 1034 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 1050 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system includes an advertising campaign framework having a testing platform, one or more application programming interfaces (APIs), and software components including one or more software programs and software code libraries. A storage medium stores instructions of the testing platform, one or more APIs, and software components. Processing logic is coupled to the storage medium. The processing logic is configured to execute the instructions to receive a function call from an ad test software or an ad campaign software of an advertising entity, to provide a set of functionality for programmatically creating an ad test to be displayed within an initiated software application of a user during an ad campaign to determine user attention during the ad test, and to generate a response that is sent to the ad test software or the ad campaign software of the advertising entity. The response includes one or more function calls with parameters including at least one of types of ad tests, formats of ad tests, questions of ad tests, and placements of ad tests within an ad campaign.

In one example, the parameters of the response include an identification of the type of test, an identification of the ad campaign and features or functions of the ad campaign including a type of operating system for a mobile device and the cost information for a type of ad campaign for delivering video ads and the ad test to determine user attention to mobile devices. The cost information for a type of ad campaign comprises cost-per-click (CPC), cost-per-mille (CPM), cost-per-completed-view (CPCV), or cost-per-install (CPI).

In one embodiment, the processing logic is further configured to execute instructions to receive an ad request, upon a play ad event of the initiated software application that is associated with the advertising services software of the device and process the ad request. The processing logic is further configured to execute instructions to send to the device an ad response with at least one ad campaign that includes at least one ad test for displaying to the user via an opt in screen advertisement of the at least ad campaign.

In one example, the ad test displays a video advertisement to the user and the user receives a question after the completion of the video advertisement.

In one embodiment, the processing logic is configured to execute the instructions to receive a test response from the device with the test response indicating an answer from the user in response to the question of the ad test and process the test response from the device and determine a binary result in terms of the answer being correct or incorrect.

In another example, the processing logic is configured to execute the instructions to receive a test response from the device with the test response indicating one or more answers from the user in response to one or more questions of the ad test and process the test response from the device and determine a level of user interest in the video advertisement based on the one or more answers of the user for the ad test.

In one embodiment, a machine-accessible non-transitory medium containing executable computer program instructions which when executed by a system cause the system to perform a method. The method includes receiving, with a programmatic ad campaign framework of the system, a function call from ad test software or ad campaign software of an advertising entity, and providing, with the programmatic ad campaign framework of the system, a set of functionality for creating an ad test. The method further includes generating and sending, with the programmatic ad campaign framework of the system, a response to the ad test software or the ad campaign software of the advertising entity. The response includes one or more function calls with parameters including at least one of types of ad tests, formats of ad tests, questions of ad tests, and placements of ad tests within an ad campaign.

In one example, the parameters of the response include an identification of the ad campaign and features or functions of the ad campaign including a type of operating system for a mobile device, the cost information for a type of ad campaign for delivering video ads to mobile devices, a conversion rate for representing a likelihood of user ad interaction or conversion, a payer or non-payer category, an in-app purchase (IAP) parameter, and an engagement rate.

In one embodiment, the method further includes receiving an ad request, upon a play ad event of an initiated software application that is associated with advertising services software of a device of a user and process the ad request. The method also includes sending to the device an ad response with at least one ad campaign that includes at least one ad test for displaying to the user via an opt in screen advertisement of the at least ad campaign.

In one example, the ad test displays a video advertisement to the user and the user receives a question after the completion of the video advertisement.

In one embodiment, the method further includes receiving a test response from the device with the test response indicating an answer from the user in response to the question of the ad test and processing the test response from the device and determining a binary result in terms of the answer being correct or incorrect.

In another embodiment, the method includes receiving a test response from the device with the test response indicating one or more answers from the user in response to one or more questions of the ad test and processing the test response from the device and determining a level of user interest in the video advertisement based on the one or more answers of the user for the ad test.

In one embodiment, a method for programmatically creating and modifying ad tests for displaying on a device includes receiving, with a programmatic ad campaign framework of a system, a function call from ad test software or ad campaign software of an advertising entity and providing, with the programmatic ad campaign framework of the system, a set of functionality for creating an ad test. The method also includes generating and sending, with the programmatic ad campaign framework of the system, a response to the ad test software or the ad campaign software of the advertising entity. The response includes one or more function calls with parameters including at least one of types of ad tests, formats of ad tests, questions of ad tests, and placements of ad tests within an ad campaign.

In one example, the parameters of the response include an identification of the ad campaign and features or functions of the ad campaign including a type of operating system for a mobile device, the cost information for a type of ad campaign for delivering video ads to mobile devices, a conversion rate for representing a likelihood of user ad interaction or conversion, a payer or non-payer category, an in-app purchase (IAP) parameter, and an engagement rate.

In one embodiment, the method further includes receiving an ad request, upon a play ad event of an initiated software application that is associated with advertising services software of the device of a user and process the ad request and send to the device an ad response with at least one ad campaign that includes at least one ad test for displaying to the user via an opt in screen advertisement of the at least ad campaign. The ad test displays a video advertisement to the user and the user receives a question after the completion of the video advertisement.

In one embodiment, the method further includes receiving a test response from the device with the test response indicating an answer from the user in response to the question of the ad test and processing the test response from the device and determining a binary result in terms of the one or more answer being correct or incorrect.

In another embodiment, the method further includes receiving a test response from the device with the test response indicating one or more answers from the user in response to one or more questions of the ad test and processing the test response from the device and determining a level of user interest in the video advertisement based on the one or more answers of the user for the ad test.

In one embodiment, a device for displaying an ad test includes a storage medium to store instructions of advertising services software and processing logic coupled to the storage medium. The processing logic is configured to execute the instructions of advertising services software to generate and send a function call from the device to an ad system and to receive an ad response from the ad system. The ad response includes at least one ad campaign having at least one ad test for displaying to a user via an opt in screen advertisement of the at least ad campaign. In one example, the ad test displays a video advertisement to the user and the user receives a question after the completion of the video advertisement.

In one embodiment, the processing logic is configured to execute the instructions to generate and send a test response from the device with the test response indicating an answer from the user in response to the question of the ad test.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An ad system, comprising:
   a dedicated computer having an advertising campaign framework with a testing platform for creating customized ad tests for a plurality of different advertising entities, one or more application programming interfaces (APIs), and software components including one or more software programs and software code libraries;
   a storage medium coupled to the computer, the storage medium to store instructions of the testing platform, one or more APIs, and software components; and processing logic configured to execute the instructions for the computer to receive with a network connection a function call from an advertising entity that includes an identification of the advertising entity, to provide a set of functionality for programmatically creating an ad test including a video ad and post ad test to be displayed in-app within an initiated non-web browser software application of mobile devices of a plurality of users during an ad campaign to determine user attention during the video ad that is displayed on the mobile devices of all of the plurality of users, and to generate a response, with the advertising campaign framework, that is sent from the ad system to the advertising entity with the network connection to provide ad test functionality for an ad test that is selected by the advertising entity from a plurality of ad test options for a selectable ad campaign, selectable format functionality of ad tests, selectable question functionality of ad tests, volume settings during ad tests, and selectable placement functionality of ad tests for timing placement within the selectable ad campaign based on a type of operating system functionality for each mobile device, wherein the processing logic is further configured to execute instructions to send to the mobile devices an ad response with the ad campaign that includes at least one ad test for displaying on display devices of the mobile devices and receiving user interaction with hardware of at least one mobile device including user touch points on at least one ad test of at least one display device that indicates an emotional state of at least one user.

2. The system of claim 1, wherein the response to provide an identification of the type of test, an identification of the ad campaign and features or functions of the ad campaign including a type of operating system functionality for a mobile device and cost information functionality for a type of ad campaign for delivering video ads and the ad test to determine user attention to mobile devices.

3. The system of claim 2, wherein the cost information for a type of ad campaign comprises cost-per-click (CPC), cost-per-mille (CPM), cost-per-completed-view (CPCV), cost-per-action (CPA), or cost-per-install (CPI).

4. The system of claim 1, wherein the processing logic is further configured to execute instructions to:
receive an ad request, upon a play ad event of the initiated software application that is associated with the advertising services software of a mobile device and process the ad request, wherein receiving user interaction with the hardware of the at least one mobile device further comprises receiving user interaction that is sensed with the hardware including a motion device, a gyroscope, or an accelerometer of the mobile device to indicate an emotional state and engagement of the user with the ad test.

5. The system of claim 4, wherein the ad test displays a video advertisement to the user and the user receives a question after the completion of the video advertisement.

6. The system of claim 5, wherein the processing logic is configured to execute the instructions to:
receive a test response from the mobile device with the test response indicating a answer from the user in response to the question of the ad test; and
process the test response from the mobile device and determine a binary result in terms of the answer being correct or incorrect.

7. The system of claim 5, wherein the processing logic is configured to execute the instructions to:
receive a test response from the mobile device with the test response indicating one or more answers from the user in response to one or more questions of the ad test; and
process the test response from the mobile device and determine a level of user interest in the video advertisement based on the one or more answers of the user for the ad test.

8. A machine-accessible non-transitory storage medium containing executable computer program instructions which when executed by a system cause the system to perform a method, the method comprising:
receiving, with a programmatic ad campaign framework of the system, a function call with a network connection from an advertising entity that includes an identification of the advertising entity;
providing, with the programmatic ad campaign framework of the system, a set of functionality for creating an ad test including a video ad and post ad test to be displayed in-app within an initiated non-web browser software application of mobile devices of a plurality of users during an ad campaign to determine user attention during the video ad that is displayed on the mobile devices of all of the plurality of users;
generating and sending, with the programmatic ad campaign framework of the system, a response with the network connection from the system to the ad test software or the ad campaign software of the advertising entity to provide ad test functionality for an ad test that is selected by the advertising entity from a plurality of ad test options for a selectable ad campaign, selectable format functionality of ad tests, selectable question functionality of ad tests, volume settings during ad tests, and selectable placement functionality of ad tests for timing placement within the selectable ad campaign based on a type of operating system functionality for each mobile device, wherein the processing logic is further configured to execute instructions to send to the mobile devices an ad response with the ad campaign that includes at least one ad test for displaying on display devices of the mobile devices and receiving user interaction with hardware of at least one mobile device including user touch points on at least one ad test of at least one display device that indicates an emotional state of at least one user.

9. The machine-accessible non-transitory storage medium of claim 8, wherein the response to provide an identification of the ad campaign and features or functions of the ad campaign including a type of operating system for a mobile device, the cost information for a type of ad campaign for delivering video ads to mobile devices, a conversion rate for representing a likelihood of user ad interaction or conversion, a payer or non-payer category, an in-app purchase (IAP) parameter, and an engagement rate.

10. The machine-accessible non-transitory storage medium of claim 8, wherein the method further comprises:
receiving an ad request, upon a play ad event of an initiated software application that is associated with advertising services software of a mobile device of a user and process the ad request, wherein receiving user interaction with the hardware of the at least one mobile device further comprises receiving user interaction that is sensed with the hardware including a motion device, a gyroscope, or an accelerometer of the mobile device to indicate an emotional state and engagement of the user with the ad test.

11. The machine-accessible non-transitory storage medium of claim 10, wherein the ad test displays a video advertisement to the user and the user receives a question after the completion of the video advertisement.

12. The machine-accessible non-transitory storage medium of claim 11, wherein the method further comprises:
receiving a test response from the mobile device with the test response indicating a answer from the user in response to the question of the ad test; and
processing the test response from the mobile device and determining a binary result in terms of the answer being correct or incorrect.

13. The machine-accessible non-transitory storage medium of claim 11, wherein the method further comprises:
receiving a test response from the mobile device with the test response indicating one or more answers from the user in response to one or more questions of the ad test; and processing the test response from the mobile device and determining a level of user interest in the video advertisement based on the one or more answers of the user for the ad test.

14. A method for programmatically creating and modifying ad tests for displaying on a mobile device, comprising:
receiving, with a programmatic ad campaign framework of a system, a function call with a network connection from an advertising entity that includes an identification of the advertising entity;
providing, with the programmatic ad campaign framework of the system, a set of functionality for creating an ad test including a video ad and post ad test to be displayed in-app within an initiated non-web browser software application of mobile devices of a plurality of users during an ad campaign to determine user attention during the video ad that is displayed on the mobile devices of all of the plurality of users; and
generating and sending, with the programmatic ad campaign framework of the system, a response with the network connection from the system to the advertising entity to provide ad test functionality for an ad test that is selected by the advertising entity from a plurality of ad test options for a selectable ad campaign, selectable format functionality of ad tests, selectable question functionality of ad tests, volume settings during ad tests, and selectable placement functionality of ad tests for timing placement within the selectable ad campaign based on a type of operating system functionality for each mobile device, wherein the processing logic is further configured to execute instructions to send to the mobile devices an ad response with the ad campaign that includes at least one ad test for displaying on display devices of the mobile devices and receiving user interaction with hardware of at least one mobile device including user touch points on at least one ad test of at least one display device that indicates an emotional state of at least one user.

15. The method of claim 14, wherein the response to provide an identification of the ad campaign and features or functions of the ad campaign including a type of operating system for a mobile device, the cost information for a type of ad campaign for delivering video ads to mobile devices, a conversion rate for representing a likelihood of user ad interaction or conversion, a payer or non-payer category, an in-app purchase (IAP) parameter, and an engagement rate.

16. The method of claim 14, further comprising:
receiving an ad request, upon a play ad event of an initiated software application that is associated with advertising services software of the mobile device of a user and process the ad request, wherein receiving user interaction with the hardware of the at least one mobile device further comprises receiving user interaction that is sensed with the hardware including a motion device, a gyroscope, or an accelerometer of the mobile device to indicate an emotional state and engagement of the user with the ad test,
wherein the ad test displays a video advertisement to the user and the user receives a question after the completion of the video advertisement.

17. The method of claim 16, further comprising:
receiving a test response from the mobile device with the test response indicating a answer from the user in response to the question of the ad test; and processing the test response from the mobile device and determining a binary result in terms of the answer being correct or incorrect.

18. The method of claim 16, further comprising:
receiving a test response from the mobile device with the test response indicating one or more answers from the user in response to one or more questions of the ad test; and
processing the test response from the mobile device and determining a level of user interest in the video advertisement based on the one or more answers of the user for the ad test.

19. A mobile device for displaying an ad test, comprising:
a storage medium to store instructions of advertising services software;
a display device for displaying content including ad tests; and
processing logic coupled to the storage medium, the processing logic is configured to execute the instructions of advertising services software to generate and send a function call with a network connection from the mobile device to an ad system upon initiation of a non-web browser software application on the mobile device and to receive an ad response from the ad system with the network connection, wherein the ad response includes at least one ad campaign having at least one ad test including a video ad and post ad test for displaying to a user in-app via an opt in screen advertisement of the at least one ad campaign, wherein the ad test to be displayed in-app within the initiated non-web browser software application of the mobile device during an ad campaign to determine user attention during the video ad that is displayed on the mobile device in-app within the initiated non-web browser software application, wherein the ad test is designed based on a plurality of ad test options for a selectable ad campaign, selectable format functionality of ad tests, selectable question functionality of ad tests, volume settings during ad tests, and selectable placement functionality of ad tests for timing placement within the selectable ad campaign based on a type of operating system functionality for each mobile device, wherein the processing logic is further configured to execute instructions to receive user interaction with hardware including user touch points on at least one ad test of the display device that indicates an emotional state a user of the mobile device.

20. The mobile device of claim 19, wherein the processing logic is configured to execute the instructions to:
receive input from the user in response to the one or more questions of the ad test including user interaction that is sensed with the hardware including a motion device, a gyroscope, or an accelerometer of the mobile device to indicate an emotional state and engagement of the user with the ad test; and
generate and send a test response from the device with the test response indicating one or more answers from the user in response to the one or more questions of the ad test, wherein the ad test displays a video advertisement to the user and the user receives one or more questions after the completion of the video advertisement.

* * * * *